(12) United States Patent
Xu et al.

(10) Patent No.: US 7,043,470 B2
(45) Date of Patent: May 9, 2006

(54) METHOD AND APPARATUS FOR IMPROVING QUERYING

(75) Inventors: Zhichen Xu, Sunnyvale, CA (US); Mallik Mahalingam, Sunnyvale, CA (US); Chunqiang Tang, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 10/378,870

(22) Filed: Mar. 5, 2003

(65) Prior Publication Data
US 2004/0177061 A1    Sep. 9, 2004

(51) Int. Cl.
G06F 17/30    (2006.01)

(52) U.S. Cl. ............................................. 707/2; 707/3

(58) Field of Classification Search ............... 707/3, 707/5, 10, 100, 1, 2; 709/239, 245; 706/12; 715/500.1
See application file for complete search history.

(56) References Cited

U.S. PATENT DOCUMENTS

| | | | |
|---|---|---|---|
| 5,287,496 A | 2/1994 | Chen et al. ................ 707/203 |
| 5,802,361 A | 9/1998 | Wang et al. ............... 382/217 |
| 5,875,479 A | 2/1999 | Blount et al. ............. 711/162 |
| 5,990,810 A | 11/1999 | Williams .................... 341/51 |
| 6,269,431 B1 | 7/2001 | Dunham ..................... 771/162 |
| 6,295,529 B1 | 9/2001 | Corston-Oliver et al. ..... 707/13 |
| 6,304,980 B1 | 10/2001 | Beardsley et al. ............ 714/6 |
| 6,311,193 B1 | 10/2001 | Sekido ....................... 707/202 |
| 6,487,539 B1 | 11/2002 | Aggarwal et al. ........... 705/14 |
| 2001/0013035 A1* | 8/2001 | Cohen ........................... 707/5 |
| 2002/0138511 A1 | 9/2002 | Psounis et al. ........... 715/501.1 |
| 2002/0150093 A1 | 10/2002 | Ott et al. ................... 370/389 |
| 2003/0004942 A1 | 1/2003 | Bird ............................. 707/3 |
| 2003/0074369 A1 | 4/2003 | Schuetze et al ......... 707/103 R |
| 2003/0159007 A1 | 8/2003 | Sawdon et al ............. 711/154 |
| 2003/0163493 A1 | 8/2003 | Burns et al. ............... 707/204 |
| 2004/0054807 A1 | 3/2004 | Harvey et al. ............. 709/243 |
| 2004/0088282 A1* | 5/2004 | Xu et al. ...................... 707/3 |
| 2004/0088301 A1* | 5/2004 | Mahalingam et al. ....... 707/100 |
| 2004/0098377 A1 | 5/2004 | Kraft ............................. 707/3 |
| 2004/0098502 A1 | 5/2004 | Xu et al. .................... 709/238 |
| 2004/0143666 A1 | 7/2004 | Xu et al. .................... 709/227 |
| 2004/0177061 A1 | 9/2004 | Xu et al. ....................... 707/3 |
| 2004/0181607 A1 | 9/2004 | Xu et al. .................... 209/239 |
| 2004/0205242 A1 | 10/2004 | Xu et al. .................... 709/245 |
| 2005/0108203 A1 | 5/2005 | Tang et al. .................... 707/3 |

OTHER PUBLICATIONS

Berry, M. W. et al., "Matrices, Vector Spaces, and Information Retrieval ", SIAM Review, 1999, vol. 41, No. 2, p. 335-362.

(Continued)

Primary Examiner—Apu M. Mofiz
(74) Attorney, Agent, or Firm—Richard P. Lange (57) ABSTRACT

In a method of improving querying, a plurality of items of information are transformed into a plurality of vectors, where each item of information of the plurality of items of information is mapped to a respective vector of said plurality of vectors. A plurality of vectors is associated with a subset of nodes selected from a plurality of nodes. Each vector associated with a respective node of said plurality of nodes is based on a similarity between each vector of said plurality of vectors.

26 Claims, 8 Drawing Sheets

OTHER PUBLICATIONS

Deerwester, S. et al., "Indexing by Latent Semantic Analysis", downloaded Jul. 14, 2005.

Fu, K. et al., "Fast and Secure Distributed Read-Only File System", ACM Transactions on Computer Systems, Feb. 2002, vol. 20, No. 1.

Gifford, D. K. et al., "Semantic File Systems", 13th ACM Symposium on Operating Systems Principals, Oct. 1991.

Gopal, B. et al., "Intergrating Content-Based Access Mechanisms with Hierarchical File Systems", USENIX, 3rd Symposium on OSDI, Feb. 1999.

Kubiatowicz, J. et al., "OceanStore: An Architecture for Global-Scale Persistent Storage", ASPLOS 2000.

Patterson, H. et al., "SnapMirror. File System Based Asynchronous Mirroring for Disaster Recovery", USENIX, Fast 2002 Conference on File and Storage Technologies, Jan. 2002.

Quinlan, S. et al., "Venti: A New Approach to Archival Storage", downloaded Jul. 14, 2005.

Ratnasamy, S. et al., "A Scalable Content-Addressable Network", ACM SIGCOMM '01, Aug. 2001.

Santry, D. S. et al., "Deciding When to Forget in the Elephant File System", 17th ACM Symposium on Operating Systems Principles, Dec. 1999, p. 110-123.

Tang, C. et al., "PeerSearch: Efficient Information Retrieval in Peer-to-Peer Networks", HP Labs Palo Alto, HPL-2002-198, Jul. 2002.

Weatherspoon, H. et al., "Erasure Coding vs. Replication: A Quantitative Comparison", downloaded Jul. 14, 2005.

Welsh, M. et al., "Querying Large Collection of Music for Similarity", downloaded Jul. 14, 2005.

Cohen et al., "A Case for Associative Peer to Peer Overlays", downloaded Dec. 29, 2005.

Crespo et al., "Routing Indices for Peer-to-Peer Systems", downloaded Dec. 29, 2005.

Crespo et al., "Semantic Overlay Networks for P2P Systems " Google Technologies Inc., Stanford Univ., downloaded Dec. 29, 2005.

Tang et al., "pSearch: Information Retrieval in Structured Overlays " ACM HotNets-I'02, Princeton, NJ, 2002.

* cited by examiner

| ROUTING LEVEL | ZONE | NEIGHBORING ZONES | RESIDENTS |
|---|---|---|---|
| $R_0$ | $R_0Z$ | $(R_0N_{1L}, R_0N_{1U}) ... (R_0N_{DL}, R_0N_{DU})$ | A, D, F... |
| $R_1$ | $R_1Z$ | $(R_1N_{1L}, R_1N_{1U}) ... (R_1N_{1L}, R_1N_{1U})$ | A, D, G |
| ... | ... | ... | ... |
| $R_L$ | $R_LZ$ | $(R_1N_{1L}, R_1N_{1U}) ... (R_1N_{1L}, R_1N_{1U})$ | A |

METHOD AND APPARATUS FOR IMPROVING QUERYING

FIELD

This invention relates generally to network systems. More particularly, the invention relates to querying in a network.

DESCRIPTION OF THE RELATED ART

Generally, the quantity of information that exists on the Internet is beyond the capability of typical centralized search engines to efficiently search. One study estimated that the deep Web may contain 550 billion documents, which is far greater than the 2 billion pages that Google identified. Moreover, the rate that information continues to grow is typically doubling each year.

Peer-to-peer (P2P) systems have been proposed as a solution to the problems associated with conventional centralized search engines. P2P systems offer advantages such as scalability, fault tolerance, and self-organization. These advantages spur an interest in building a decentralized information retrieval (IR) system based on P2P systems.

However, current P2P searching systems may also have disadvantages and drawbacks. For instance, P2P searching systems are typically unscalable or unable to provide deterministic performance guarantees. More specifically, the current P2P searching systems are substantially based on centralized indexing, query flooding, index flooding or heuristics. As such, centralized indexing systems, such as Napster, suffer from a single point of failure and performance bottleneck at the index server. Flooding-based techniques, such as Gnutella, send a query or index to every node in the P2P system, and thus, consuming large amounts of network bandwidth and CPU cycles. Heuristics-based techniques try to improve performance by directing searches to only a fraction of the population but may fail to retrieve relevant documents.

One class of P2P systems, the distributed hash table (DHT) systems (e.g., content addressable network) provide an improved scalability over the other P2P systems. However, DHT systems are not without disadvantages and drawbacks. Since they offer a relatively simple interface for storing and retrieving information, DHT systems are not suitable for full-text searching.

Moreover, besides the performance inefficiencies, a common problem with typical P2P systems is that they do not incorporate advanced searching and ranking algorithms devised by the IR community. Accordingly, the P2P systems typically rely on simple keyword based searching.

SUMMARY

One embodiment pertains to a method of improving querying. The method includes transforming a plurality of items of information into a plurality of vectors, each item of information of the plurality of items of information being mapped to a respective vector of the plurality of vectors. The method also includes associating the plurality of vectors to a subset of nodes selected from a plurality of nodes, each vector associated with a respective node of the plurality of nodes based on a similarity between each vector of the plurality of vectors.

Another embodiment relates to an apparatus for of improving querying. The apparatus includes means for transforming a plurality of items of information into a plurality of vectors, each item of information of the plurality of items of information being mapped to a respective vector of the plurality of vectors. The apparatus also includes means for associating the plurality of vectors to a subset of nodes selected from a plurality of nodes, each vector associated with a respective node of the plurality of nodes based on a similarity between each vector of the plurality of vectors.

Yet another embodiment pertains to a system for querying. The system includes a plurality of peers forming a peer-to-peer network, an auxiliary overlay network configured to be implemented by a subset of peers of the plurality of peers and a peer search module configured to be executed by each peer of the subset of peers and configured to implement the auxiliary overlay network. The peer search module is further configured to store key pairs configured to comprise of a vector and a pointer to a location of information.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
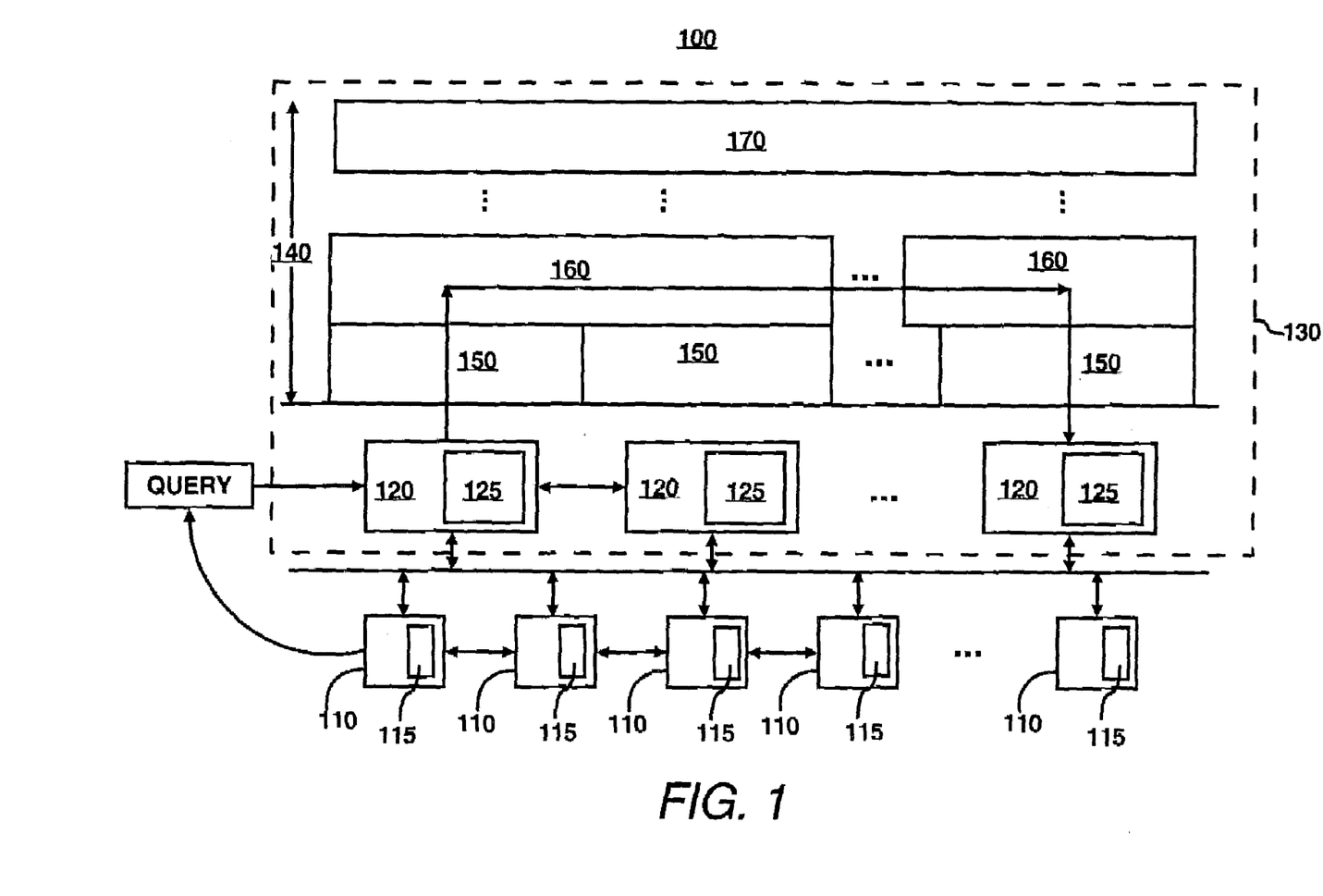
FIG. 1 illustrates an exemplary block diagram of an embodiment.

FIG. 1 illustrates an exemplary schematic diagram of an embodiment 100. As shown in FIG. 1, peers (or nodes) 110 may form a peer-to-peer network. Each peer of peers 110 may store and/or produce information (e.g., documents, data, web pages, etc.). The items of information may be stored in a dedicated storage device (e.g., mass storage) 115 accessible by the respective peer.

A subset of the peers 110 may be selected as peer search nodes 120 to form a peer search network 130. Criterion utilized to select peer search nodes may include node availability, storage and computing capacity, network connectivity of the nodes, and the like. The peer search network 130 may be a mechanism to permit controlled placement of key pairs within the peer search peers 120. In the peer search network 130, information may be represented as a key pair (or data pair) of vector representation of information (i.e., a vector) and a pointer to the location of the information. The peers 110 may be configured to publish, i.e., form key pairs, and forward the key pairs of their searchable information to the peer search network 130.

The peer search network 130 may then organize the key pairs based on the vector components of the key pairs. More particularly, the organization of the key pairs may be based on the similarity of the vector components, i.e., similar vectors are grouped together on one node and/or in neighboring nodes. The vector component of the key pairs may be performed using vector transformations such as vector space modeling (VSM) or latent index semantic indexing (LSI). The groups of similar key pairs may form indices, which are subsequently stored on associated storage devices 125.

When a query is received, a vector representation of the query may be formulated. For example, a VSM and/or LSI based vectors may be generated from the query. The vectorized query is then routed in the peer search network 130 to locate the requested information. A VSM-based search and a LSI-based search may be conducted individually or simultaneously. Moreover, since the key pairs are ordered in proximity, the query search time may be substantially improved.

The vector component of the key pairs and the vector representation of queries may be performed using vector transformations such as vector space modeling or latent index semantic indexing.

In another embodiment, the peer search network 130 may be configured to include an auxiliary overlay network 140 for routing. A logical space formed by the peer search network 130 may be a Cartesian space (e.g., d-torus), where d is the dimension of the logical space. The logical space is divided into fundamental (or basic) zones 150 where each node of the subset is the peers is an owner. Additional zones 160, 170 are formed over the fundamental zones to provide expressway routing of key pairs and queries. Details of expressway routing may be found in pending U.S. application Ser. No. 10/231,184, filed on Aug. 29, 2002, and entitled "EXPRESSWAY ROUTING AMONG PEERS", by Xu et al.; which is hereby incorporated by reference in its entirety.

Figure 2:
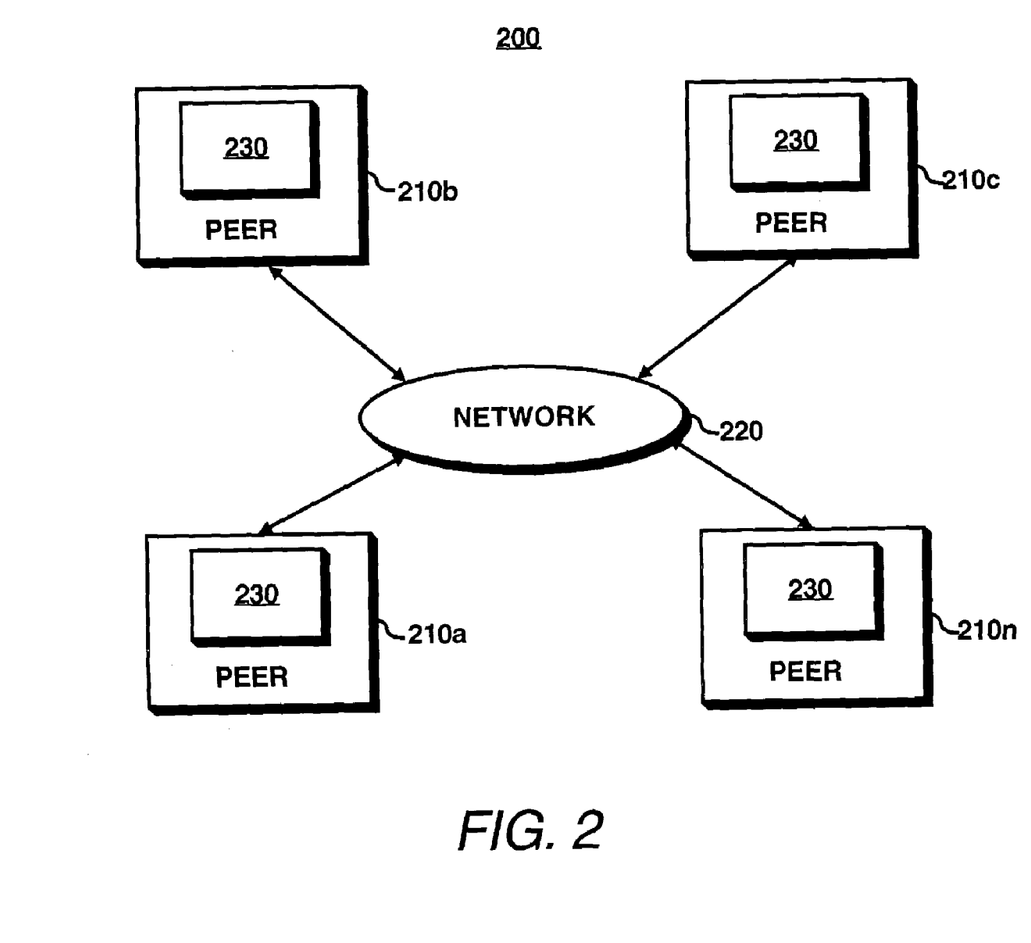
FIG. 2 illustrates an exemplary block diagram of a system where an embodiment may be practiced.

FIG. 2 illustrates an exemplary block diagram of a system 200 where an embodiment may be practiced. It should be readily apparent to those of ordinary skill in the art that the system 200 depicted in FIG. 2 represents a generalized schematic illustration and that other components may be added or existing components may be removed or modified.

As shown in FIG. 2, the system 200 includes a plurality of peers 210a . . . 210n. The peers 210a . . . 210n may be configured to exchange information among themselves and with other network nodes over a network 220. The peers 210a . . . 210n may be computing platforms (e.g., personal digital assistants, laptop computers, workstations, and other similar devices) that have a network interface. The peers 210a . . . 210n may be further configured to execute an application software program that provides the capability to share information (e.g., files, data, applications, etc.) in a peer-to-peer manner. An example of a peer-to-peer software application is KAZAA, NAPSTER, MORPHEUS, or other similar P2P applications.

The network 220 may be configured to provide a communication channel among the peers 210a . . . 210n. The network 220 may be implemented as a local area network, wide area network or combination thereof. The network 220 may implement wired protocols such as Ethernet, token ring, etc., wireless protocols such as Cellular Digital Packet Data, Mobitex, IEEE 801.11b, Wireless Application Protocol, Global System for Mobiles, etc., or combination thereof.

According to an embodiment, some of the peers of the peers 210a . . . 210b may include a peer search module 230. The peer search module 230 may implement the peer search network as described supra and in further detail below for controlled placement and querying of key pairs in the peer search network.

Figure 3:
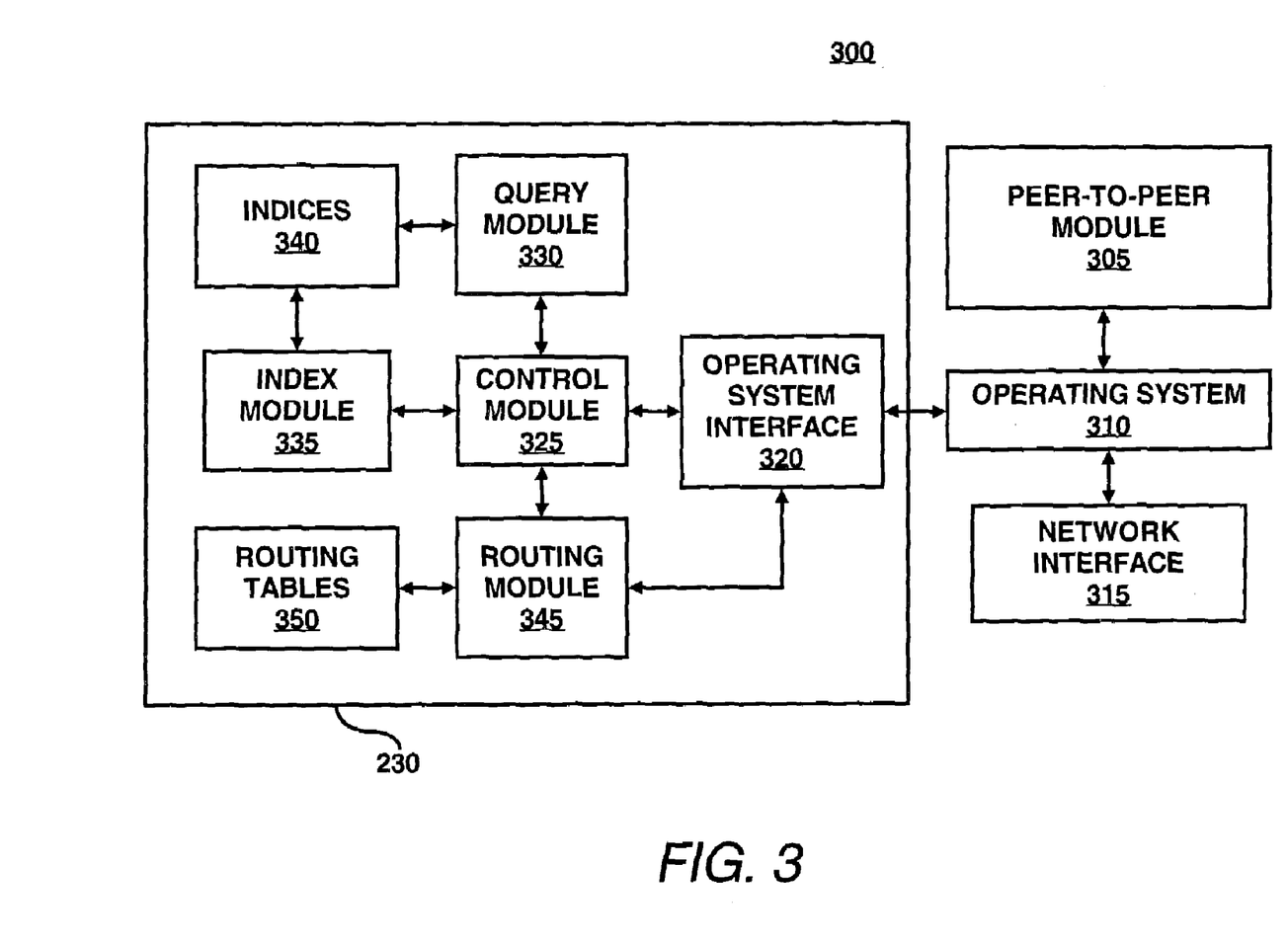
FIG. 3 illustrates an exemplary architecture for the peer search module shown in FIG. 1 in accordance with yet another embodiment.

FIG. 3 illustrates an exemplary architecture 300 for the peer search module 230 shown in FIG. 2 in accordance with an embodiment. It should be readily apparent to those of ordinary skill in the art that the architecture 300 depicted in FIG. 3 represents a generalized schematic illustration and that other components may be added or existing components may be removed or modified. Moreover, the architecture 300 may be implemented using software components, hardware components, or a combination thereof.

As shown in FIG. 3, the architecture 300 may include a peer-to-peer module 305, an operating system 310, the peer search module 230, and a network interface 315. The peer-to-peer module 305 may be configured to provide the capability to a user of a peer to share information with another peer, i.e., each peer may initiate a communication session with another peer. The peer-to-peer module 305 may be a commercial off-the-shelf application program, a customized software application or other similar computer program. Such programs such as KAZAA, NAPSTER, MORPHEUS, or other similar P2P applications may implement the peer-to-peer module 305.

The peer search module 230 may be configured to monitor an interface between the peer-to-peer module 305 and the operating system 315 through an operating system interface 320. The operating system interface 310 may be implemented as an application program interface, a function call or other similar interfacing technique. Although the operating system interface 320 is shown to be incorporated within the peer search module 230, it should be readily apparent to those skilled in the art that the operating system interface 320 may also incorporated elsewhere within the architecture of the peer search module 230.

The operating system 310 may be configured to manage the software applications, data and respective hardware components (e.g., displays, disk drives, etc.) of a peer. The operating system 310 may be implemented by the MICROSOFT WINDOWS family of operating systems, UNIX, HEWLETT-PACKARD HP-UX, LINUX, RIM OS, and other similar operating systems.

The operating system 310 may be further configured to couple with the network interface 315 through a device driver (not shown). The network interface 315 may be configured to provide a communication port for the respective peer over the network 220 (shown in FIG. 2). The network interface 315 may be implemented using a network interface card, a wireless interface card or other similar input/output device.

The peer search module 230 may also include a control module 325, a query module 330, an index module 335, at least one index (shown as 'indices' in FIG. 3) 340, and a routing module 345. As previously noted, the peer search module 230 may be configured to implement the peer search network for the controlled placement and querying of key pairs in order to facilitate searching for information. The peer search module 230 may be implemented as a software program, a utility, a subroutine, or other similar programming entity. In this respect, the peer search module 230 may be implemented using software languages such as C, C++, JAVA, etc. Alternatively, the peer search module 230 may be implemented as an electronic device utilizing an application specific integrated circuit, discrete components, solid-state components or combination thereof.

The control module 325 of the peer search module 230 may provide a control loop for the functions of the peer search network. For example, if the control module 325 determines that a query message has been received, the control module 325 may forward the query message to the query module 330.

The query module 330 may be configured to provide a mechanism to respond to queries from peers (e.g., peers 110) or other peer search nodes (e.g., 120). As discussed above and in further detail with respect to FIG. 4, the query module 330 may implement receive query for information from either a peer and another peer search node. If the query is not already vectorized, i.e., converted into a vector, the query is vectorized. The query module 330 may be configured to search the indices 340 for any matching key pairs. If there are matching key pairs, the query module 330 may forward the matching key pairs to the requesting peer. If there are no matching key pairs, the query module 330 may route the query to another selected peer search node based on the vectorized query.

The indices module 340 may contain a database of similar key pairs as an index. There may be a plurality of indices associated with each peer search node. In one embodiment, a peer search node may be assigned multiple terms, thus the indices module 340 may contain a respective index for each term. The indices module 340 may be maintained as a linked-list, a look-up table, a hash table, database or other searchable data structure.

The index module 335 may be configured to create and maintain the indices 340. In one embodiment, the index module 335 may receive key pairs published by peers (e.g., peers 100 in FIG. 1). In another embodiment, the index module 335 may actively retrieve, i.e., 'pull', information from the peers. The index module 335 may also apply the vector algorithms to the retrieved information and form the key pairs for storage in the indices 340.

The control module 325 may also be interfaced with the routing module 345. The routing module 345 may be configured to provide expressway routing for vectorized queries and key pairs. Further detail of the operation of the routing module 345 is described with respect to FIG. 6.

Figure 4:
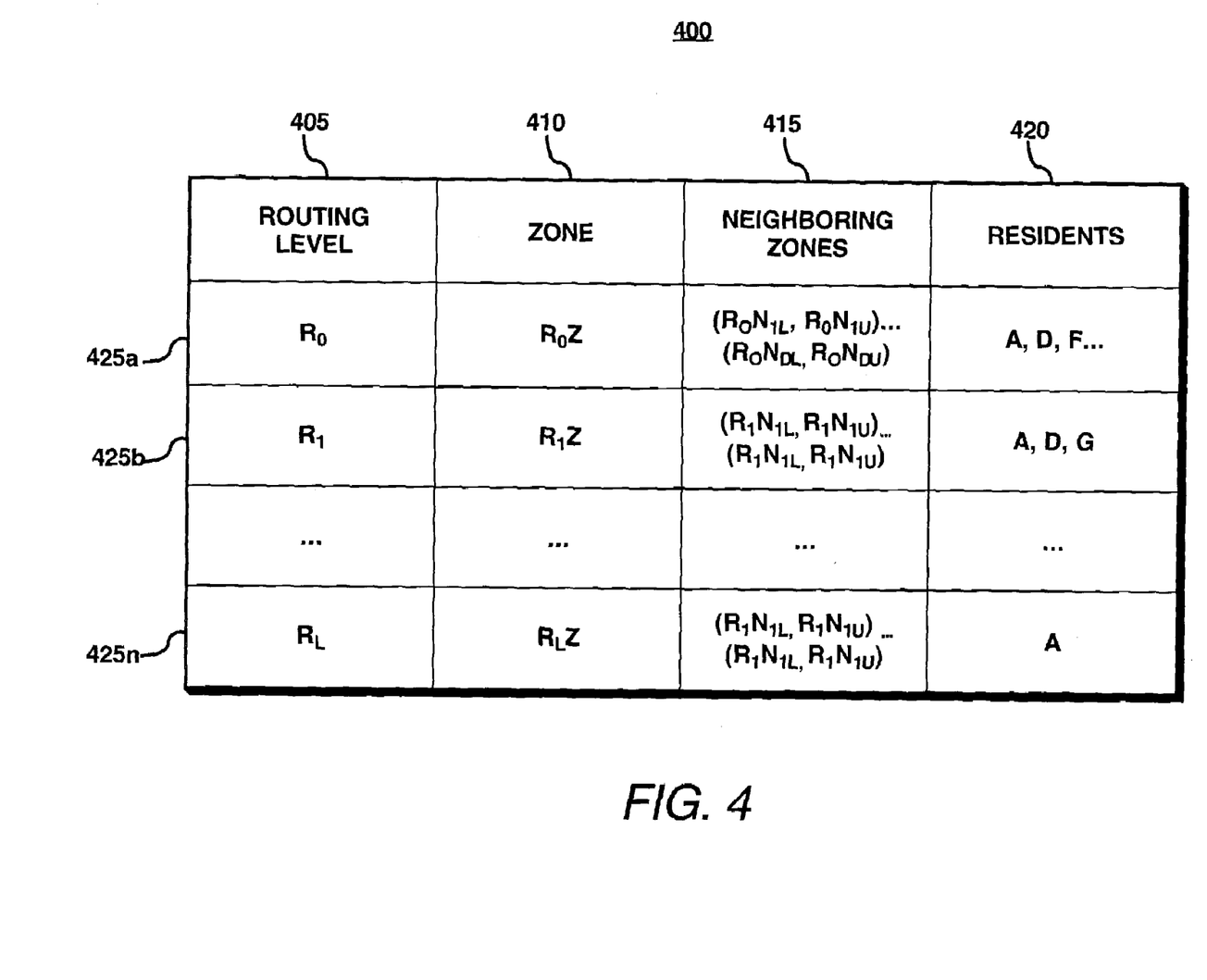
FIG. 4 illustrates an exemplary flow diagram for the routing module of the peer search module shown in FIG. 3 in accordance with yet another embodiment.

The routing module 345 may access routing table 350 to implement expressway routing. FIG. 4 illustrates an exemplary diagram of the routing table 350 in accordance with an embodiment. It should be readily apparent to those of ordinary skill in the art that the routing table 350 depicted in FIG. 4 represents a generalized illustration and that other fields may be added or existing fields may be removed or modified.

As shown in FIG. 4, the routing table 360 may include a routing level field 405, a zone field 410, a neighboring zones field 415, and a resident field 420. In one embodiment, the values in the routing level field 405, the zone field 410, the neighboring zones 415, and the resident field 420 are associated or linked together in each entry of the entries 425a ... 425n.

A value in the routing level field 405 may indicate the span the between zone representatives. The range of values for the level of the zone may range from the basic unit of the P2P system ($R_L$) to the entire space of the P2P system ($R_O$). The largest value in the routing level field 405 may indicate the depth of the routing table as well as being the current table entry.

A value in the zone field 410 may indicate which zones the associated peer is aware thereof. Values in the neighboring zones field 415 indicate the identified neighbor zones to the peer. A neighbor zone may be determined by whether a zone shares a common border in the coordinate space; i.e., in a d-dimensional coordinate space, two nodes are neighbors if their coordinate spans overlap along d-1 dimensions and abut along one dimension.

Values in the resident fields 420 may indicate the identities of residents for the neighboring zones stored in the neighboring zones field 415. The values in residents field 420 may be indexed to the values the neighboring zones field 415 to associate the appropriate resident in the proper neighboring zone.

Figure 5:
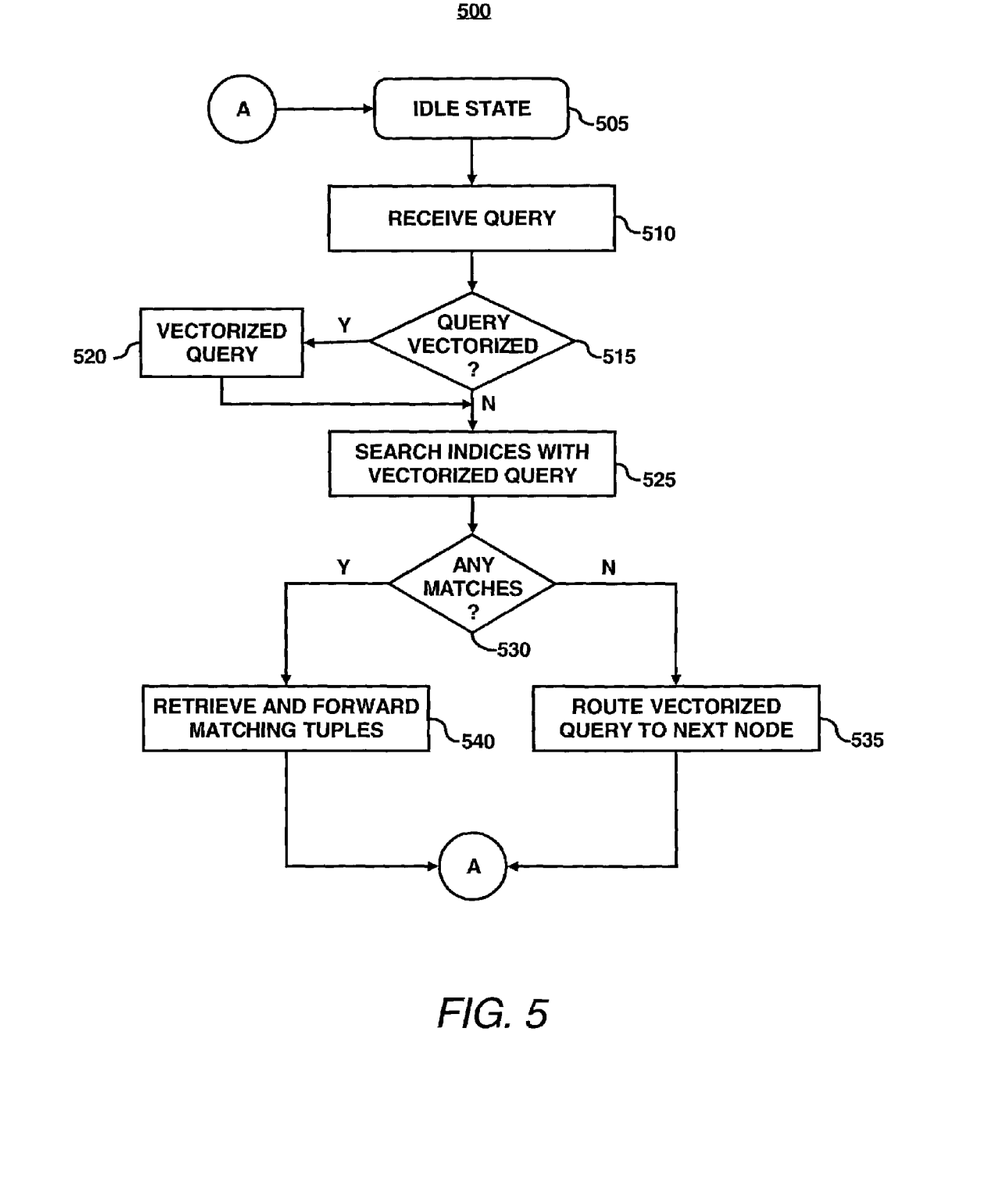
FIG. 5 illustrates an exemplary routing table for the routing module shown in FIG. 3 in accordance with yet another embodiment.

FIG. 5 illustrates an exemplary flow diagram 500 for the query module 330 (shown in FIG. 4) according to an embodiment. It should be readily apparent to those of ordinary skill in the art that this method 500 represents a generalized illustration and that other steps may be added or existing steps may be removed or modified.

As shown in FIG. 5, the query module 330 may be in an idle state, in step 505. The control module 425 may invoke a function call to the query module 330 based on detecting a query from the operating system interface 320.

In step 510, the query module 330 may receive the query. The query may be stored in a temporary memory location for processing. The query may be in a non-vectorized form since the query may originate from a peer (e.g., peer 110). A received query may be vectorized if forwarded from another peer search node. Accordingly, in step 515, the query module 330 may be configured to test if the received query is vectorized. If the query is not vectorized, the query module 330 may apply vector algorithms (e.g., vector space modeling, latent semantic indexing, etc.) to the query, in step 520. Subsequently, the query module 330 proceeds to the processing of step 525.

Otherwise, if the received query is vectorized, the query module 330 may search the indices 340 with the received query as a search term, in step 525. If the query module 330 determines there are matching key pairs, in step 520, the query module 330 may forward the matching key pairs to the initiator of the query. Subsequently, the query module 330 may return to the idle state of step 505.

Otherwise, in step 535, the query module 330 may forward the received query to the routing module 345 to the next node based on the vectorized query. Subsequently, the query module 330 may return to the idle state of step 505.

Figure 6:
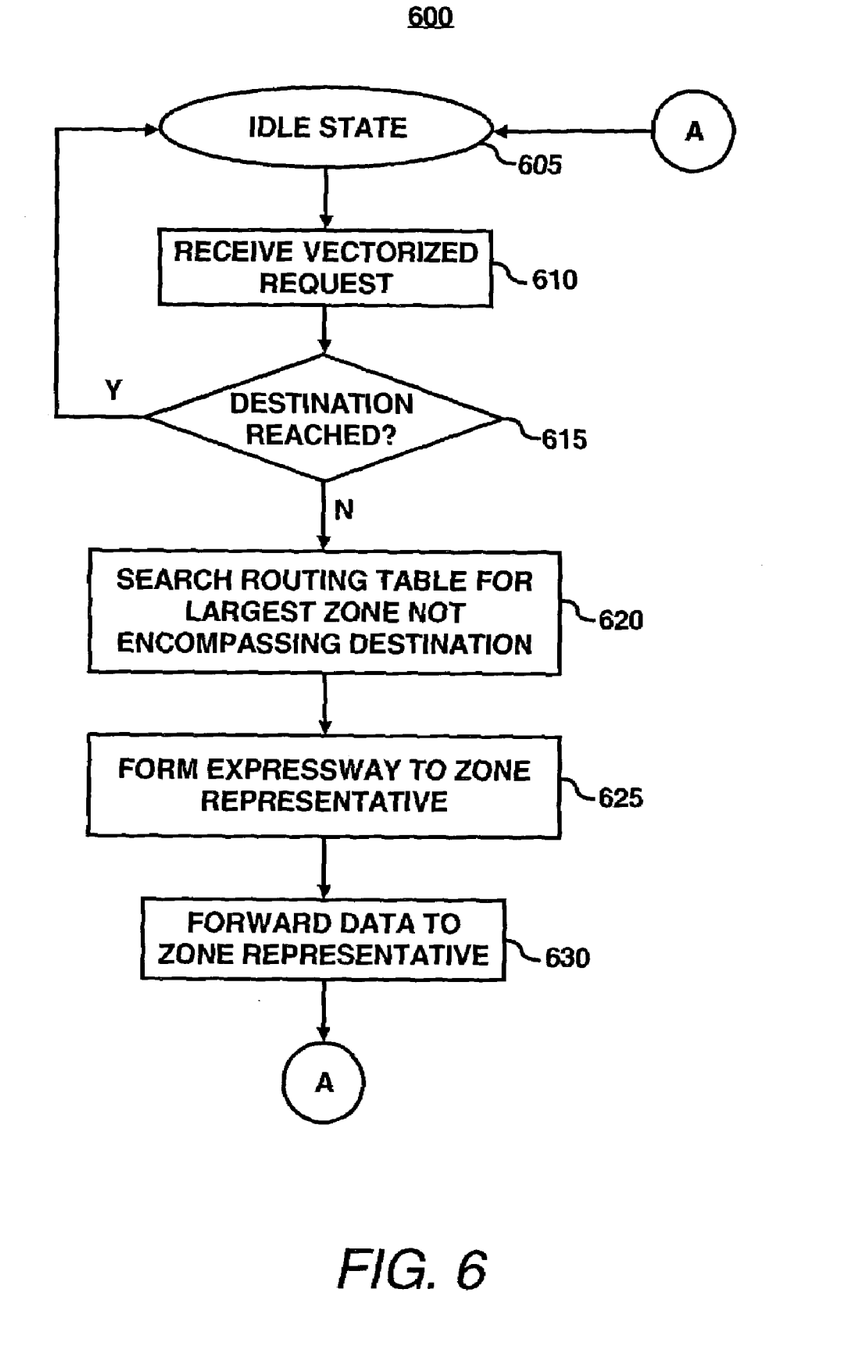
FIG. 6 illustrates an exemplary flow diagram for the query module of the peer search module shown in FIG. 3 in accordance to yet another embodiment.

FIG. 6 illustrates an exemplary flow diagram for a method 600 of the routing module 345 shown in FIG. 3 in accordance with another embodiment. It should be readily apparent to those of ordinary skill in the art that this method 600 represents a generalized illustration and that other steps may be added or existing steps may be removed or modified.

As shown in FIG. 6, the routing module 345 of the peer search module 230 may be configured to be in an idle state in step 605. The routing module 345 may monitor the network interface 315 via the operating system 320 (shown in FIG. 3) for any received requests to route data. The requests may be initiated by a user of a peer or the requests may be forwarded to the receiving peer functioning as an intermediate peer. Alternatively, the requests to route may be received from the query module 330 as described above with respect to FIG. 5.

In step 610, the routing module 345 may received the vectorized request. The routing module 345 may determine a destination address of the peer search node associated with the vectorized request.

In step 615, the routing module 345 determines whether the request has reached its destination. More particularly, the routing module 345 may check the destination address of the request to determine whether the receiving peer is the destination for the request. If the destination is the receiving peer, the routing module 345 may return to the idle state of step 605.

Otherwise, in step 620, the routing module 345 may be configured to search the routing table 350 for a largest zone not encompassing the destination. It should be noted that the largest zone that does not encompass the destination can always be found, given the way the zones are determined as described above.

In step 625, the routing module 345 may be configured to form a communication channel, i.e., an expressway, to the zone representative of the destination zone at the level of the largest zone. The routing module 345 may forward the requested data to the zone representative in the destination zone in step 630. The zone representative will then forward the data to the destination peer. Subsequently, the routing module 345 may return to the idle state of step 605.

Figure 7:
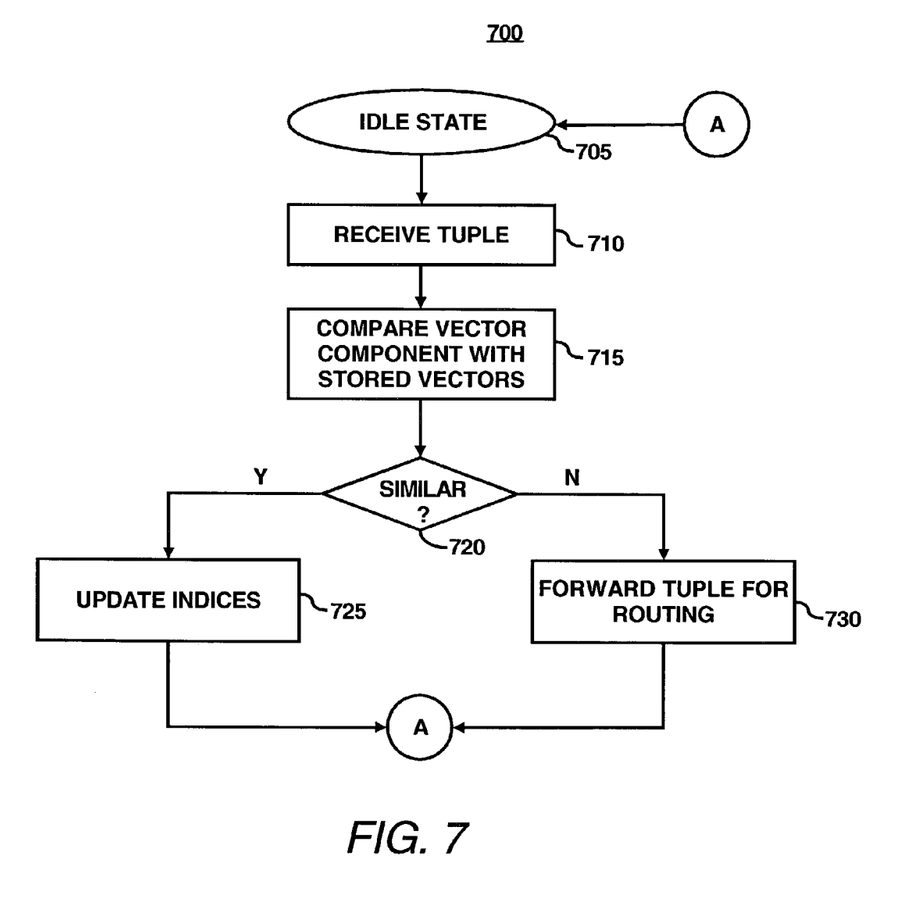
FIG. 7 illustrates an exemplary flow diagram for the routing index of the peer search module shown in FIG. 3 in accordance with yet another embodiment.

FIG. 7 illustrates an exemplary embodiment of a method 700 of the index module 335 shown in FIG. 3 in accordance with an embodiment. It should be readily apparent to those of ordinary skill in the art that this method 700 represents a generalized illustration and that other steps may be added or existing steps may be removed or modified.

As shown in FIG. 7, the index module 335 may be in an idle state, in step 705. The control module 325 may detect the receipt of a key pair through the network interface 515 through the operating system interface 320. The control module 325 may be configured to forward or invoke the index module 335.

In step 710, the index module 335 may be configured to receive the key pair. The index module 335 may store the key pair in a temporary memory location. In step 715, the vector component of the key pair is extracted.

In step 720, the index module 335 may compare the vector component for similarity to the vectors currently stored in the indices 340. In one embodiment, a cosine between the component vector and a selected vector of the stored vectors is determined. The cosine is then compared to a user-specified threshold. If the cosine exceeds the user-threshold, the two vectors are determined to be dissimilar.

If the key pair is similar to the key pairs stored in the indices, the index module 335 may update the indices with the received key pair, in step 725. Subsequently, the index module 335 may return to the idle state of step 705. Otherwise, the index module 335 may forward the received key pair to the routing module 345 for routing, in step 730. Subsequently, the index module 335 may return to the idle state of step 705.

Figure 8:
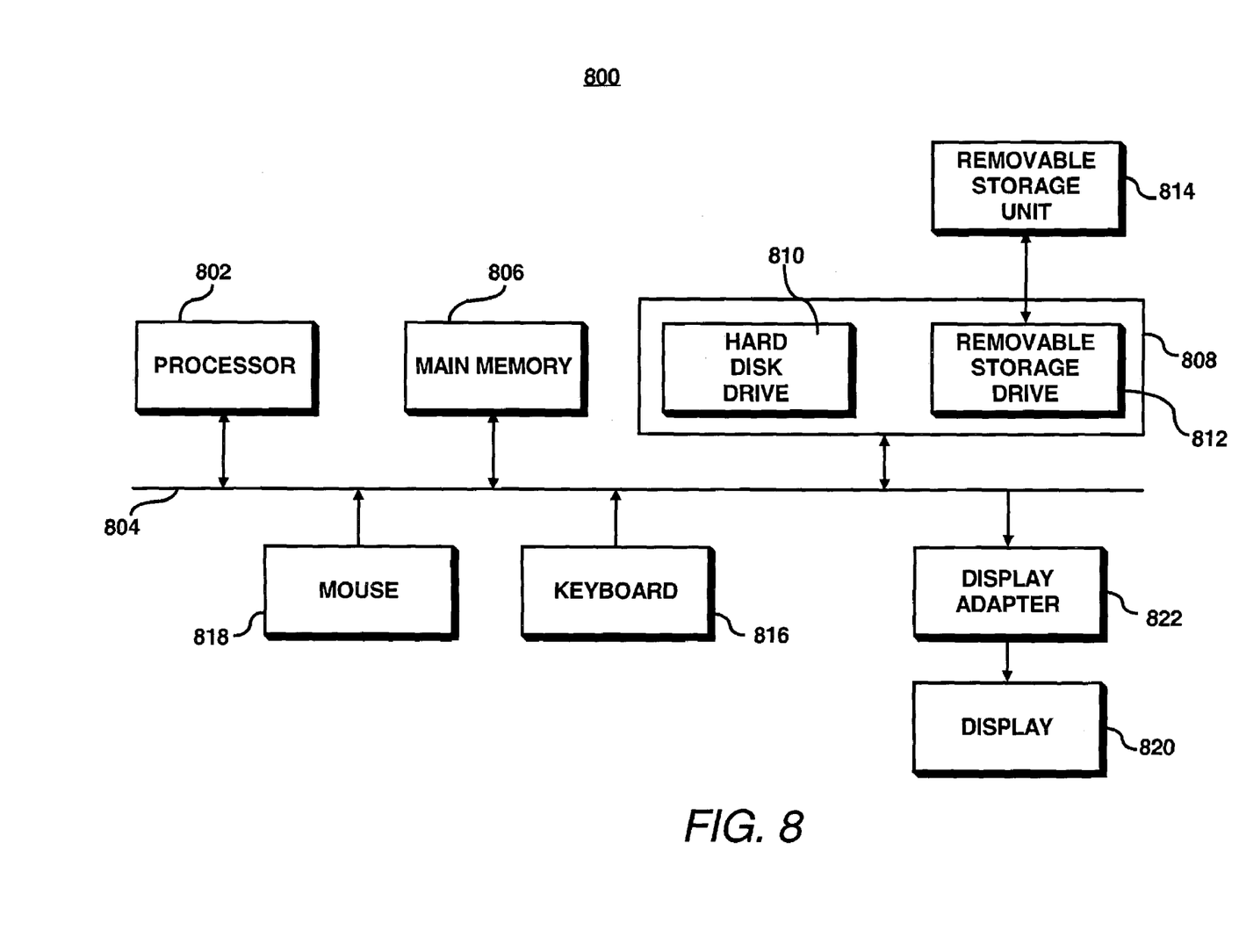
FIG. 8 illustrates a computer system where an embodiment may be practiced.

FIG. 8 illustrates an exemplary block diagram of a computer system 800 where an embodiment may be practiced. The functions of the range query module may be implemented in program code and executed by the computer system 800. The expressway routing module may be implemented in computer languages such as PASCAL, C, C++, JAVA, etc.

As shown in FIG. 8, the computer system 800 includes one or more processors, such as processor 802, that provide an execution platform for embodiments of the expressway routing module. Commands and data from the processor 802 are communicated over a communication bus 804. The computer system 800 also includes a main memory 806, such as a Random Access Memory (RAM), where the software for the range query module may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of a computer program embodiment for the range query module may be stored. The removable storage drive 812 reads from and/or writes to a removable storage unit 814 in a well-known manner. A user interfaces with the expressway routing module with a keyboard 816, a mouse 818, and a display 820. The display adaptor 822 interfaces with the communication bus 804 and the display 820 and receives display data from the processor 802 and converts the display data into display commands for the display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A computer-implemented method of improving querying, said method comprising:

transforming a plurality of items of information into a plurality of vectors, each item of information of said plurality of items of information being mapped to a respective vector of said plurality of vectors; and associating said plurality of vectors to a subset of nodes selected from a plurality of nodes, each vector associated with a respective node of said plurality of nodes based on a similarity between each vector of said plurality of vectors.

2. The method according to claim 1, further comprising:

transforming said plurality of items of information into said plurality of vectors wherein, each item of information of said plurality of items of information is a document, video, or audio file.

3. The method according to claim 1, further comprising:

forming an auxiliary overlay network from said subset of nodes;

forming a plurality of zones; and associating each zone of said plurality of zones with a respective node of said subset of nodes.

4. The method according to claim 1, wherein said transformation further comprises:

transforming said plurality of items of information into said plurality of vectors based on a vector space modeling.

5. The method according to claim 1, wherein said transformation further comprises:
transforming said plurality of items of information into said plurality of vectors based on a latent semantic indexing.

6. The method according to claim 1, further comprising:
receiving a query for requested information; and
transforming said query into a vectorized query.

7. The method according to claim 6, wherein said vectorized query is based on one of vector space modeling and a latent semantic indexing.

8. The method of according to claim 6, further comprising:
forming an auxiliary overlay network from said subset of nodes; and
locating said requested information based on routing said vectorized query through said auxiliary overlay network.

9. The method according to claim 1, further comprising:
forming groups of similar vectors from said plurality of vectors; and
associating each group of similar vectors of said groups of similar vectors with a respective node of said subset of nodes.

10. The method according to claim 9, further comprising:
ordering each group of similar vectors based on similarity between each group of similar vectors.

11. An apparatus for improving querying, said apparatus comprising:
means for transforming a plurality of items of information into a plurality of vectors, each item of information of said plurality of items of information being mapped to a respective vector of said plurality of vectors; and
means for associating said plurality of vectors to a subset of nodes selected from a plurality of nodes, each vector associated with a respective node of said plurality of nodes based on a similarity between each vector of said plurality of vectors.

12. The apparatus according to claim 11, further comprising:
means for transforming said plurality of items of information into said plurality of vectors wherein, each item of information of said plurality of items of information is a document, video, or audio file.

13. The apparatus according to claim 11, further comprising:
means for forming an auxiliary overlay network from said subset of nodes;
means for forming a plurality of zones; and
means for associating each zone of said plurality of zones with a respective node of said subset of nodes.

14. The apparatus according to claim 11, wherein said means for transformation further comprises means for transforming said plurality of items of information into said plurality of vectors based on a vector space modeling.

15. The apparatus according to claim 11, wherein said means for transformation further comprises means for transforming said plurality of items of information into said plurality of vectors based on a latent semantic indexing.

16. The apparatus according to claim 11, further comprising:
means for receiving a query for requested information; and
means for transforming said query into a vectorized query.

17. The apparatus according to claim 16, wherein said vectorized query is based on one of vector space modeling and a latent semantic indexing.

18. The apparatus of according to claim 16, further comprising:
means for forming an auxiliary overlay network from said subset of nodes; and
means for locating said requested information based on routing said vectorized query through said auxiliary overlay network.

19. The apparatus according to claim 11, further comprising:
means for forming groups of similar vectors from said plurality of vectors; and
means for associating each group of similar vectors of said groups of similar vectors with a respective node of said subset of nodes.

20. The apparatus according to claim 19, further comprising:
means for ordering each group of similar vectors based on similarity between each group of similar vectors.

21. A system for querying, said system comprising:
a plurality of peers forming a peer-to-peer network;
an auxiliary overlay network configured to be implemented by a subset of peers of said plurality of peers; and
a peer search module configured to be executed by each peer of said subset of peers and configured to implement said auxiliary overlay network, wherein said peer search module is further configured to store key pairs configured to comprise of a vector and a pointer to a location of information.

22. The system according to claim 21, wherein said peer search module is further configured to store key pairs based on similarities of respective vectors of said key pairs.

23. The system according to claim 21, wherein said vector is generated from a selected item of information based on one of a vector space modeling and a latent semantic indexing.

24. The system according to claim 21, wherein said peer search module is further configured to receive a query for a selected item of information and to convert said query into a vectorized query.

25. The system according to claim 24, wherein said peer search module is further configured to route said vectorized query through said auxiliary overlay network to search for said selected information.

26. The system according to claim 25, wherein said vectorized query is based at least on one of said vector space modeling and said latent semantic indexing.

* * * * *

UNITED STATES PATENT AND TRADEMARK OFFICE
CERTIFICATE OF CORRECTION

| | |
|---|---|
| PATENT NO. | : 7,043,470 B2 |
| APPLICATION NO. | : 10/378870 |
| DATED | : May 9, 2006 |
| INVENTOR(S) | : Zhichen Xu et al. |

It is certified that error appears in the above-identified patent and that said Letters Patent is hereby corrected as shown below:

In column 9, line 15, in Claim 8, after "method" delete "of".

In column 10, line 11, in Claim 18, after "apparatus" delete "of".

Signed and Sealed this

Seventh Day of April, 2009

JOHN DOLL
*Acting Director of the United States Patent and Trademark Office*